(12) United States Patent
Urabe

(10) Patent No.: US 7,099,728 B2
(45) Date of Patent: Aug. 29, 2006

(54) QUALITY CONTROL SYSTEM, METHOD, AND PROGRAM

(75) Inventor: Kazuhisa Urabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/495,375

(22) PCT Filed: Feb. 10, 2003

(86) PCT No.: PCT/JP03/01404

§ 371 (c)(1),
(2), (4) Date: May 12, 2004

(87) PCT Pub. No.: WO03/069527

PCT Pub. Date: Aug. 21, 2003

(65) Prior Publication Data

US 2005/0071032 A1    Mar. 31, 2005

(51) Int. Cl.
*G06F 19/00* (2006.01)
(52) U.S. Cl. .................. 700/109; 700/110; 700/115; 702/84
(58) Field of Classification Search ............ 700/109, 700/222, 110, 115, 116; 702/84, 179, 185, 702/187, 82; 235/375
See application file for complete search history.

(56) References Cited

U.S. PATENT DOCUMENTS 5,978,751 A * 11/1999 Pence et al. ............... 702/179
6,036,087 A *  3/2000 Hong et al. ................ 235/375
6,246,919 B1 *  6/2001 Hassel ....................... 700/116
6,321,983 B1 * 11/2001 Katayanagi et al. ........ 235/380
6,816,751 B1 * 11/2004 Alice et al. ................ 700/222

FOREIGN PATENT DOCUMENTS

| JP | 9050949 | 2/1997 |
| JP | 10091236 | 4/1998 |
| JP | 10100030 | 4/1998 |
| JP | 10222568 | 8/1998 |
| JP | 2000048066 | 2/2000 |
| JP | 2000181958 | 6/2000 |
| JP | 2001307055 | 11/2001 |

OTHER PUBLICATIONS

International Search Report, International Application No. PCT/JP03/01404.

* cited by examiner

*Primary Examiner*—Albert W. Paladini
*Assistant Examiner*—Steven R. Garland
(74) *Attorney, Agent, or Firm*—David G. Conlin; Howard M. Gitten; Edwards Angell Palmer & Dodge LLP

(57) ABSTRACT

Inspection items of inspection steps performed in processes 40 to 70, namely, in the processes of parts incoming, production, outgoing and market, and quality defect information items generated in connection with these inspections, are registered in advance in a code master database 17 as systematized codes. A part ID unique to a given part and a product ID unique to a given product are correlatively recorded in a part bar code label 81 and in a product bar code label 82 respectively. These bar code labels 81 and 82 are affixed to each part and product. In each of the processes 40 to 70, the part IDs or the product IDs are read, inspection results and quality defect information are input, and information is stored in databases 7, 9, 12, 14 and 16, whereby the quality history of each product is managed.

7 Claims, 14 Drawing Sheets

FIG.4

| inspection code | inspection item |
|---|---|
| 101 | compressor start up |
| 102 | rated voltage |
| 103 | temperature inspection |
| 104 | noise sound inspection |
| . | . |

FIG.5

| defect code | defect item |
|---|---|
| 201 | compressor does not start up |
| 202 | wrong rated voltage |
| 203 | temperature inspection NG |
| 204 | no cool |
| 205 | noise sound |
| . | . |

FIG.6

| part ID | inspection date and time | inspection code | pass/fail | defect code |
|---|---|---|---|---|
| PCMPLA159CBF0010823001 | 01082413:10 | 101 | OK | |
| PCMPLA159CBF0010823002 | 01082413:20 | 101 | OK | |
| . | . | . | . | |

82 product ID

A1XRFLCS 010825 001 model name   input date   serial number

| planned production date | input order | model name | number of production units |
|---|---|---|---|
| 010825 | 1 | A1XRFLCS | 800 |
| 010826 | 2 | A1XRFHC | 200 |
| · | · | · | · |

| input date | model name | control number | product ID | part ID |
|---|---|---|---|---|
| 010825 | A1XRFLCS | 001 | A1XRFLCS010825001 | PCMPLA159CBF0010823001 |
| 010825 | A1XRFLCS | 002 | A1XRFLCS010825002 | PCMPLA159CBF0010823002 |
| 010825 | A1XRFLCS | 003 | A1XRFLCS010825003 | PCMPLA159CBF0010823003 |
| · | · | · | · | · |

FIG.10

| product ID | inspection date and time | inspection code | pass/fail | defect code |
|---|---|---|---|---|
| A1XRFLCS010825001 | 01082513:21 | 101 | OK | |
| A1XRFLCS010825001 | 01082513:22 | 102 | OK | |
| A1XRFLCS010825001 | 01082513:23 | 103 | NG | 203 |
| . | . | . | . | |

| | | |
|---|---|---|
| product ID | A1XRFLCS010825001 | |
| model name | A1XRFLCS | |
| input date | 010825 | |
| serial number | 001 | |
| line out production date and time | 010825 13:23 | |
| defective item | 203 | temperature inspection NG |

| | |
|---|---|
| repair date and time | 010825 15:13 |

| | | |
|---|---|---|
| cause | 101 | circuit board defect |
| responsible factor | 01 | part |
| responsible process | 01 | circuit board assembly |
| part information | DUNTK8356DE01 | main circuit board |
| countermeasure | 01 | replace part |

[OK]  [CANCEL]

FIG.12

| code | cause |
|------|-------|
| 101 | circuit board defect |
| 102 | cabinet defect |
| 103 | connector defect |
| 104 | connector insertion defect |
| 105 | fan motor defect |
| 106 | door packing deterioration |
| . | . |

FIG.13

| code | responsible factor |
|------|-------------------|
| 01 | part |
| 02 | workmanship |
| 03 | design |
| 04 | other |

FIG.14

| code | responsible process |
|------|--------------------|
| 01 | circuit board assembly |
| 02 | final assembly |
| 03 | molding process |
| 04 | subcontract |
| 05 | . |

FIG.15

| part code | part name |
|---|---|
| DUNTK8356DE01 | main circuit board |
| RMOTRA036CBD1 | fan motor |
| CCAB0169CFE01 | cabinet |
| FDORRB2173CAKZ | door packing |
| · | · |

FIG.16

| code | countermeasure |
|---|---|
| 01 | replace part |
| 02 | in-process repair |
| 03 | parts selection |
| 04 | add operation |
| 05 | re-inspect |
| 06 | · |

FIG.17

| product ID | repair date and time | cause | responsible factor | responsible process | part information | countermeasure |
|---|---|---|---|---|---|---|
| A1XRFLCS010825001 | 010825 15:13 | 101 | 01 | 01 | DUNTK8356DE01 | 01 |
| A1XRFLCS010825010 | 010825 15:43 | 101 | 01 | 01 | DUNTK8356DE01 | 01 |
| A1XRFLCS010825035 | 010825 16:15 | 101 | 01 | 01 | DUNTK8356DE01 | 01 |
| · | · | · | · | · | · | · |

| product ID | A1XRFLCS010825001 |
| --- | --- |
| model name | A1XRFLCS |
| input date | 010825 |
| manufacturing serial number | 001 |

| inspection date and time | 01082613:10 |
| --- | --- |
| inspection code | 103 temperature inspection |
| pass/fail | OK ●    NG ○ |
| | defect ☐ ☐ |

[OK] [CANCEL]

FIG.19

| product ID | inspection date and time | inspection code | pass/fail | defective code |
| --- | --- | --- | --- | --- |
| A1XRFLCS010825001 | 01082613:21 | 103 | OK | |
| A1XRFLCS010825002 | 01082613:22 | 103 | OK | |
| · | · | · | · | |

| product ID | A1XRFLCS010825001 |  |
|---|---|---|
| model name | A1XRFLCS |  |
| input date | 010825 |  |
| manufacturing serial number | 001 |  |
| defect occurrence date | 010926 |  |
| defect item | 204 | no cool |

| repair date and time | 010927 15:13 |  |
|---|---|---|

| cause | 105 | door packing deterioration |
|---|---|---|
| responsible factor | 01 | part |
| responsible process | 04 | subcontract |
| part information | FDORRB2173CAKZ | door packing |
| countermeasure | 01 | replace part |

[OK]  [CANCEL]

FIG.21

| part ID | defect occurrence date | defective item | repair date and time | cause | responsible factor | responsible process | part information | countermeasure |
|---|---|---|---|---|---|---|---|---|
| A1XRFLCS010825001 | 010926 | 204 | 010927 15:13 | 105 | 01 | 04 | FD0RB2173CAKZ | 01 |
| A1XRFLCS010825100 | 010927 | 204 | 010928 10:43 | 101 | 01 | 01 | DUNTK8356DE01 | 01 |
| A1XRFLCS010825985 | 010928 | 204 | 010928 16:15 | 101 | 01 | 01 | DUNTK8356DE01 | 01 |
| . | | | | | | | | |

FIG.23

| product ID | A1XRFLCS010825001 | | | | |
|---|---|---|---|---|---|

| parts incoming | inspection date and time | inspection item | pass/fail | remarks | |
|---|---|---|---|---|---|
| | 010824 13:10 | compressor startup | OK | part ID PCMPLA159CBF0010823001 | |

| production | inspection date and time | inspection item | pass/fail | remarks | |
|---|---|---|---|---|---|
| | 010825 13:21 | compressor startup | OK | | |
| | 010825 13:22 | rated voltage | OK | | |
| | 010825 13:23 | temperature inspection | NG | failed temperature inspection | |

| repair | repair date and time | cause | responsible factor | responsible process | part information | countermeasure |
|---|---|---|---|---|---|---|
| | 010825 13:10 | circuit board defect | part | circuit board assembly | main circuit board | replace part |

| outgoing inspection | inspection date and time | inspection item | pass/fail | remarks | |
|---|---|---|---|---|---|
| | 010826 13:10 | temperature inspection | OK | | |

| marketing | defect occurrence date | defective item | | | | |
|---|---|---|---|---|---|---|
| | 010926 | no cool | | | | |
| | repair date and time | cause | responsible factor | responsible process | part information | countermeasure |
| | 010927 15:13 | door packing deterioration | part | subcontract | FDORRB2173CAKZ | replace part |

FIG.25

| model name | A1XRFLCS | |
|---|---|---|
| process | defective item | number of defects |
| parts incoming | compressor does not start | 2 |
| | abnormal rpm | 1 |
| | total | 3 |
| production | failed temperature inspection | 5 |
| | wrong rated voltage | 3 |
| | compressor does not start | 1 |
| | abnormal noise | 1 |
| | total | 10 |
| outgoing inspection | | |
| | total | 0 |
| marketing | no cool | 3 |
| | noise sound | 2 |
| | total | 5 |

QUALITY CONTROL SYSTEM, METHOD, AND PROGRAM

BACKGROUND OF THE INVENTION

1. Technical Field

The present invention relates to quality control systems, quality control methods, quality control programs and recording media on which the quality control program is recorded, which enable product quality information to be tracked throughout the life cycle of a product as it passes through the processes of parts incoming, production, outgoing inspection and market.

2. Background Art

A system for performing product quality control has previously been disclosed in Japanese Unexamined Patent Publication No. 10-091236.

This conventional quality control system obtains improved quality by storing set history information and, when a defect is discovered, by preventing outgoing of products having identical set histories and taking steps to avoid the reoccurrence of the same defect. The system is adapted to collect, for each product, essential process quality information from production facilities, and to halt outgoing when a problem occurs in a manufacturing step.

However, a shortcoming encountered with the aforementioned conventional quality control system is that when a quality-related problem has occurred on the market, it is not possible to trace backwards and ascertain for example whether the quality problem in that product arose at the production process, or whether it was a quality problem in a part constituting that product. That is to say, the shortcoming encountered is that it does not provide a quality history for each product or model throughout parts incoming, production, outgoing and market.

A further shortcoming is that even if the quality histories of each product or model were to be tabulated, because the representation of quality defect information items generated during the life cycle of a product is not systematized, it would be impossible to tabulate at the same level, and excessive time would be required for the tabulation and for subsequent analysis.

BRIEF SUMMARY OF THE INVENTION

The present invention has been devised to eradicate such shortcomings. It is an object of this invention to provide a quality control system, a quality control method, a quality control program and a recording medium on which a quality control program is recorded, whereby, by tracking the quality history of each product or model and performing integrated management of quality data, the tabulation and analysis of information relating to when and what sort of inspections were carried out on each product, and, in the event of a defect having occurred, what sort of analysis and countermeasures were carried out, are easily accomplished.

A quality control system of the present invention is a quality control system which, throughout a life cycle of a product as it passes through processes of parts incoming, production, outgoing and market, carries out an inspection at each process, and collects and manages quality information, using an information recording medium, and comprises a first storage means for correlatively storing a product ID unique to a given product, this product ID being recorded in an information recording medium affixed to each product, and a part ID unique to a given part, this part ID being recorded in an information recording medium affixed to each part composing the aforesaid product; a master code registering means in which are registered in advance, as systematized master codes, inspection items of inspection steps performed in the aforementioned processes, and quality defect information items generated in connection with at least these inspections; a reading means for reading, during an inspection step in an aforementioned process, the product ID from the information recording medium affixed to a product being inspected; an input means for inputting quality information including inspection results and quality defect information, this quality information being input correlatively with the product ID that has been read by the aforementioned reading means; and a second storage means for storing the product ID and the quality information input from this input means; wherein a quality history is managed for each product on the basis of the quality information stored in this second storage means. The quality control system of the present invention may further comprise a first recording means for recording the product ID unique to a given product in an information recording medium; and a first affixing means for affixing to the product, in an initial step of production, the abovementioned information recording medium in which the product ID has been recorded. The quality control system of the present invention may still further comprise a second recording means for recording the part ID unique to a given part in an information recording medium; and a second affixing means for affixing to the part, when shipping the part, the abovementioned information recording medium in which the part ID has been recorded.

By using systematized master codes for inspection items of inspection steps performed in the various processes and for quality defect information items generated in connection with these inspections, and by inputting the inspection results and the quality defect information, the present invention, having features of the sort described above, achieves terminology standardization and systematization, and is thereby capable of integrated management and multidimensional analysis of quality data.

In the present invention, the aforementioned product ID may include at least a model name, a date of entry to production, and a serial number for each individual product. Further, the aforementioned quality defect information may include, classified by process and product, at least the product ID, a cause, a responsible factor, a responsible step, a part information and a countermeasure. Furthermore, the part ID includes at least a part code, a part puroduction date, and a serial number of the individual product for which the part in question is used.

This enables quality information to be tabulated and analyzed for each product and model, and also enables quality history to be tracked through the processes of parts incoming, production, outgoing and market. The true cause of a defect can therefore be ascertained and a countermeasure rapidly introduced. Moreover, when a quality problem has occurred at the market process, it is possible to trace back to the production steps or to the parts, and to identify the origin of the problem.

The quality control system of the present invention can also be provided as a quality control method implemented by this system. That is to say, a quality control method of the present invention is a quality control method which, throughout a life cycle of a product as it passes through processes of parts incoming, production, outgoing and market, carries out an inspection at each process, and collects and manages quality information, using an information recording medium, and comprises a step of correlatively recording, in the information recording medium, a product ID unique to a given product and a part ID unique to each part composing that product; a step of affixing this information recording medium to each part or each product; a step of correlatively storing the product ID recorded in the information recording medium affixed to each product, and the part ID recorded in the information recording medium affixed to each part composing this product; a step of registering in advance, as systematized master codes, inspection items of inspection steps performed in the aforementioned processes, and quality defect information items generated in connection with at least these inspections; a step of reading, during an inspection step in each process, the product ID from the information recording medium affixed to a product being inspected; a step of inputting quality information including inspection results and quality defect information, this quality information being input correlatively with the product ID that has been read; and a step of storing the input product ID and quality information.

The quality control method of the present invention can also be provided as a quality control program for implementing this method. That is to say, a computer-readable quality control program of the present invention is a computer-readable quality control program for executing, throughout a life cycle of a product as it passes through processes of parts incoming, production, outgoing and market, processing for carrying out an inspection at each process, and collecting and managing quality information, using an information recording medium, the quality control program comprising a step of respectively recording, in the information recording medium, a product ID unique to a given product and a part ID unique to each part composing that product, by correlatively inputting that product ID and part ID; a step of correlatively storing, in a first storage means, the product ID recorded in the aforementioned information recording medium affixed to each product and the part ID recorded in the aforementioned information recording medium affixed to each part composing that product; a step of reading, during an inspection step in each process, the product ID from the information recording medium affixed to the product being inspected, this product ID being read by a reading means; and a step of using systematized master codes for inspection items of inspection steps performed in the various processes and for quality defect information items generated in connection with these inspections, to input the inspection results and quality defect information from an input means, thereby storing in a second storage means, correlatively with the aforementioned read product ID, quality information including the input inspection results and quality defect information. This quality control program can also be provided as a recording medium in which it has been recorded.

BRIEF DESCRIPTION OF THE DRAWINGS

FIG. 4 is an explanatory diagram showing the contents of the inspection code masters.

FIG. 5 is an explanatory diagram showing the contents of the defective code masters.

FIG. 6 is an explanatory diagram of the parts incoming data.

FIG. 10 is an explanatory diagram showing the contents of the inspection DB.

FIG. 11 is an explanatory diagram showing an example of a screen for input of repair data.

FIG. 12 is an explanatory diagram showing the contents of the cause masters.

FIG. 13 is an explanatory diagram showing the contents of the responsible factor masters.

FIG. 14 is an explanatory diagram showing the contents of the responsible step masters.

FIG. 15 is an explanatory diagram showing the contents of the parts masters.

FIG. 16 is an explanatory diagram showing the contents of the countermeasure masters.

FIG. 17 is an explanatory diagram showing the contents of the repair database.

FIG. 18 is an explanatory diagram showing an example of a screen for input of outgoing inspection information.

FIG. 19 is an explanatory diagram showing the contents of the outgoing inspection database.

FIG. 20 is an explanatory diagram showing an example of a screen for input of market information.

FIG. 21 is an explanatory diagram showing the contents of the market information DB.

FIG. 23 is an explanatory diagram showing the quality history of a product.

FIG. 25 is an explanatory diagram showing the quality history of a model.

BEST MODE FOR CARRYING OUT THE INVENTION

A preferred embodiment of the present invention will now be described with reference to the accompanying drawings.

Figure 1:
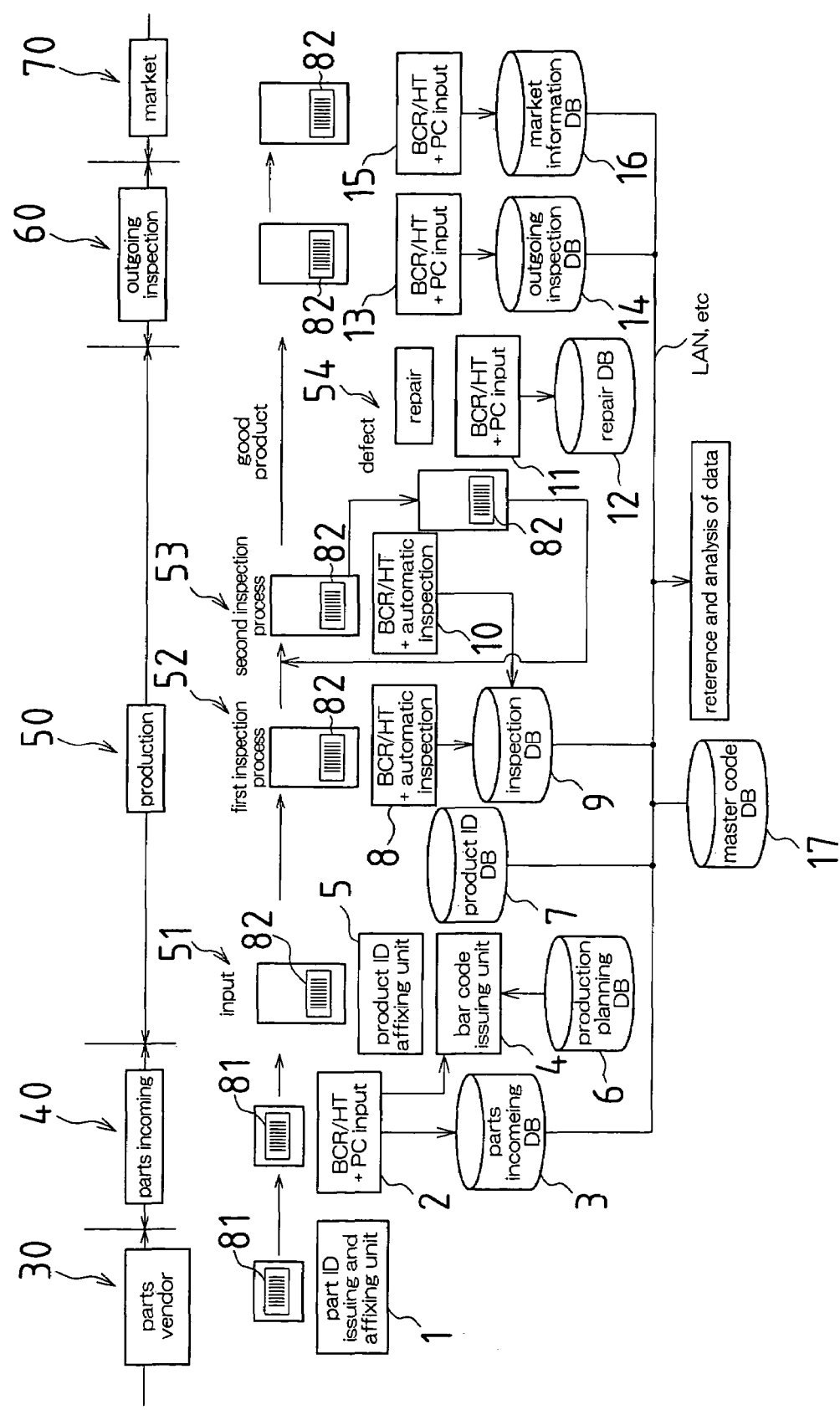
FIG. 1 is an explanatory diagram showing schematically the processes of parts incoming, production, outgoing inspection and market, and the configuration of the quality control system of the present invention arranged in correspondence with these processes.

FIG. 1 is an explanatory diagram showing schematically the processes of parts incoming, production, outgoing inspection and market, and the configuration of the quality control system of the present invention arranged in correspondence with these processes.

The quality control system of the present invention is a system which uses a bar code label 81 and a bar code label 82, each of these being an information recording medium, to collect and manage quality information obtained by carrying out inspections throughout the life cycle of a product as it passes through the processes of parts manufacture and outgoing 30 by the parts vendor, parts incoming 40 by the product manufacturer, production 50, outgoing inspection 60 and market 70.

The parts manufacture and outgoing process 30 is therefore provided with a part ID issuing and affixing unit 1 for issuing the part bar code label 81, which serves as a part ID, and for affixing this to the part.

The parts incoming process 40 is provided with a reading and input unit 2 for reading the part ID from the part bar code label 81 affixed to the part and for inputting various items, a parts incoming database (DB) 3, and a master code database (DB) 17 in which a variety of master codes have been stored. It should be noted that use of the master code database 17 is shared with the subsequent processes 50 to 70.

The production process 50 includes the following steps: a production line input step 51, various inspection steps (two inspections in this embodiment: namely, a first inspection step 52 and a second inspection step 53), and a repair step 54.

The input step 51 is provided with a bar code issuing unit 4, an affixing unit 5 for the product bar code label 82, a production planning database (DB) 6 and a product ID database (DB) 7. The first inspection step 52 is provided with an inspection result output unit 8 for reading the product ID from the product bar code label 82 and for outputting various inspection results, and with an inspection database (DB) 9. The second inspection step 53 is similarly provided with an inspection result output unit 10 for reading the product ID from the product bar code label 82 and for outputting various inspection results, and with the inspection database (DB) 9. The repair step 54 is provided with a reading and input unit 11 for reading the product ID from the product bar code label 82 and for inputting various items, and with a repair database (DB) 12.

The outgoing inspection process 60 is provided with a reading and input unit 13 for reading the product ID from the product bar code label 82 and for inputting various items, and with an outgoing inspection database (DB) 14.

The market process 70 is provided with a reading and input unit 15 for reading the product ID from the bar code label 82 of a product which is being marketed and for inputting various items, and with a market information database (DB) 16.

These reading and input units 2, 11, 13 and 15, together with the parts incoming DB 3, the product ID DB 7, the inspection DB 9, the repair DB 12, the outgoing inspection DB 14, the market information DB 16 and the master code DB 17, are connected by for example a LAN to form a network. This enables quality information to be collected in real time in the processes 40 to 70 by accessing any of the DBs 3, 7, 9, 12, 14, 16 and 17 as required.

It should be noted that the reading and input units 2, 11, 13 and 15 comprise a bar code reader (BCR) or a handy terminal (HT), and a personal computer (PC), and that the inspection result output units 8 and 10 comprise a bar code reader (BCR) or a handy terminal (HT), and an automatic inspection device.

Next, the method employed, in the quality control system with the above-described configuration, to collect quality information in the processes from parts manufacture and outgoing to market will be described in order.

Parts Manufacture and Outgoing Process 30

In the case of a principal part of a product, the part ID issuing and affixing unit 1 prints the bar code and affixes the part bar code label 81 on each part at the stage when the part manufacturer ships these parts.

Figures 2, 3:
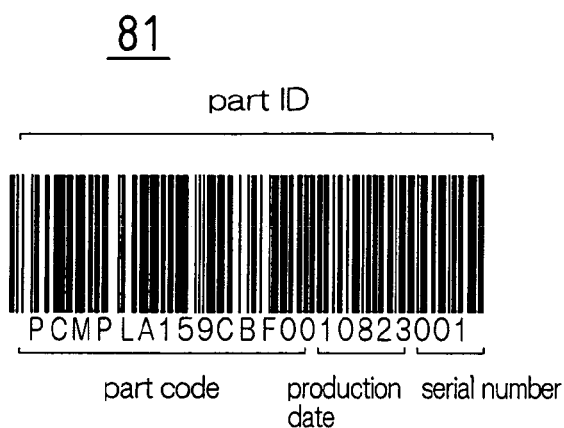
FIG. 2 is an explanatory diagram showing the contents of a part ID.
FIG. 3 is an explanatory diagram showing an example of a screen for input of parts incoming inspection information.

FIG. 2 shows the content of this part bar code label 81. The printed bar code represents the part ID. That is to say, a part code, a part puroduction date, and a (consecutive) serial number which increments for each successive part with a given part code and a given puroduction date, are printed as the bar code. Each part has a unique part ID and actual parts can be identified on the basis of the part ID.

Part Reception Process 40

In the part reception process 40, the part bar code label 81 affixed to a principal part is read by the bar code reader (hereinafter, abbreviated as "BCR") or the handy terminal (hereinafter, abbreviated as "HT") of the reading and input unit 2. The BCR or the HT is connected to the personal computer (hereinafter, abbreviated as "PC") of the reading and input unit 2, and when an inspector reads the bar code of the part bar code label 81, the result is displayed on a PC screen 110 as shown in FIG. 3.

The part ID, the part code, the puroduction date, the serial number and the inspection date and time (i.e., the current time) are displayed on this PC screen 110. The inspector enters an inspection item in an inspection code field 110a of this PC screen 110, and enters the result of the inspection (i.e., whether the part has passed or failed) in a pass/fail field 110b.

Because the inspection items are encoded in advance in a form of the sort shown in FIG. 4 and stored in the master code DB 17, the inspector enters an applicable inspection code in the inspection code field 110a. In the example illustrated in FIG. 3, "101" has been input in the inspection code field 110a and the fact that the inspection item is "compressor startup" is indicated beside this. If the inspection result is that the part has passed, the inspector enters a check mark in the "OK" portion of the pass/fail field 110b, whereas if the inspection result is that the part has failed, the inspector enters a check mark in the "NG" portion of the pass/fail field 110b. In the example illustrated in FIG. 3, a check mark has been entered in the "OK" portion.

If the part fails the inspection (i.e., a check mark has been entered in the "NG" portion) the inspector enters an applicable defective code in a defective code field 110c. Because the defective codes are encoded in advance in a form of the sort shown in FIG. 5 and stored in the master code DB 17, this defective code can be used as a key to refer the defective item for display on the screen. The inspector enters an applicable defective code (in the present embodiment, 201) in the defective code field 110c.

Thereafter, as a result of the inspector pressing an "OK" button at the bottom of the PC screen 110, these items of information displayed on the PC screen 110 are stored in the parts incoming DB 3 in a form of the sort shown in FIG. 6.

Input Step 51 of Production Process 50

Figures 7, 8, 9:
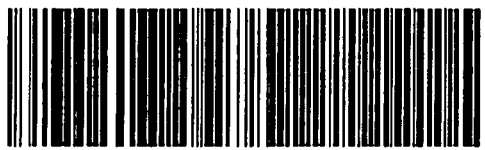
FIG. 7 is an explanatory diagram showing the contents of the product ID.
FIG. 8 is an explanatory diagram showing the contents of the production planning DB.
FIG. 9 is an explanatory diagram showing the contents of the product ID DB.

In the input step 51, which is the first step of the production, a bar code of the sort shown in FIG. 7 is printed on a label by the bar code issuing unit 4, and this product bar code label 82 is affixed to the product by the product ID affixing unit 5.

That is to say, the product ID data shown in FIG. 9 is prepared from the production planning DB 6, in which production planning data has been stored in a form of the sort shown in FIG. 8. Subsequently, the product ID is printed by the bar code issuing unit 4 and affixed to the product. The product ID includes the model name, the date of input of that model (i.e., the date on which the bar code was issued in the first step of the manufacturing process) and a (consecutive) serial number which increments for each successive product of a given model and with a given input date.

In the present embodiment, the input date (when the actual input date differs from the planned production date, the actual input date is used) and the model name shown in FIG. 9 are obtained on the basis of the part ID, which was read by the reading and input unit 2 in the part reception process 40, and on the basis of the planned production date, the input order and the model name in the production planning DB 6 shown in FIG. 8. Moreover, in order to establish a correlation between the part ID and the product ID, the input order (a control number) is incremented at the same time as the part ID is read. If the model name, the input date and the input order (i.e., the control number) obtained in this manner are joined together as a string of characters, the product ID shown in FIG. 9 is obtained, and it is this product ID that is stored in the product ID database 7.

Inspection Step 52

In the inspection step 52, the bar code of the product bar code label 82 that has been affixed to the product in the input step 51 is read by the BCR or the HT of the inspection result output unit 8, and stored in the inspection DB 9 in conjunction with the inspection result output from the automatic inspection device.

For example, a fixed BCR is installed in the inspection step 52 and the bar code of the product bar code label 82 that has been affixed to the product is read by this BCR. An inspection result including the product ID, the inspection date and time, the inspection code, whether the product has passed or failed the inspection, and the defective code, is generated in a form of the sort shown in FIG. 10 on the basis of the inspection result obtained by the automatic inspection device. This inspection result is stored in the inspection DB 9. The defective code is selected from the defective codes, shown in FIG. 5, which are stored in the master code DB 17.

If the inspection result is a pass, the product is sent to the next inspection step 53 and the next inspection is performed. In the inspection step 53, in similar manner to the inspection step 52, the bar code of the product bar code label 82 that has been affixed to the product is read by the BCR or the HT of the inspection result output unit 10, and stored in the inspection database 9 in conjunction with the inspection result output from the automatic inspection device.

When all the inspections in the production process 50 have been completed in this manner, processing shifts to the following process, namely, to the outgoing inspection process 60. The outgoing inspection process 60 is the final in-factory inspection and is usually a sampling inspection.

A product that has failed an inspection is sent to the repair step 54.

Repair Step 54

In the repair step 54, the defect is analyzed and the product is repaired. When the repair is finished, the bar code of the product bar code label 82 that has been affixed to the product is read by the BCR or the HT of the reading and input unit 11. When the bar code is read, the product ID is used as a key to refer the line out production date and time and the defective code from the inspection DB 9, and a repair data input screen 120 shown in FIG. 11 is displayed.

A person making the repair looks at the repair data input screen 120 and uses codes to enter a cause, a responsible factor, a responsible step, part information and a countermeasure from the PC of the reading and input unit 11.

In this embodiment of the invention, causes, responsible factors, responsible steps, part information and countermeasures are stored in advance in the master code DB 17 as master data in a form of the sort shown in FIGS. 12 to 16. An applicable item of the master data shown in FIGS. 12 to 16 can be refered from the master code DB 17 using a code as a key. As a result, data input can be speeded up, since it is based on the input of codes. In addition, the number of mistakes made in entering repair data can be reduced, since an applicable item is refered onto the screen, thereby providing visual confirmation. The repair information displayed on the repair data input screen 120 shown in FIG. 11 is stored in the repair DB 12 in a form of the sort shown in FIG. 17.

Outgoing Inspection Process 60

In the outgoing inspection, the bar code of the product bar code label 82 affixed to the product is read by the BCR or the HT of the reading and input unit 13, and the result of the outgoing inspection (i.e., the inspection date and time, the inspection code, the pass/fail result and the defective code) is input from an inspection result input screen 130 of the PC, as shown in FIG. 18. The information comprising the inspection date and time, the inspection code, the pass/fail result and the defective code, and including the product ID, which is displayed on the inspection result input screen 130, is then stored in the outgoing inspection DB 14 in a form of the sort shown in FIG. 19, by pressing the "OK" button at the bottom of the inspection result input screen 130.

Market Process 70

If a product develops a fault on the market, or if there is a complaint, a repair is carried out by the service division and the repaired product is sent back to the user. Before sending the product back to the user, the service division inputs the repair result.

That is to say, the bar code of the product bar code label 82 affixed to the product is read by the BCR or the HT of the reading and input unit 15, and the date on which the defect occurred, the repair date and time, the defective code, the cause code, the responsible factor code, the responsible step code, the part code and the countermeasure code are entered from a repair result input screen 140 of the PC, as shown in FIG. 20. When this is done, the entered codes are used as keys to refer applicable items from the master codes stored in the master code database 17 and shown in FIG. 5, FIG. 12, FIG. 13, FIG. 14 and FIG. 16, whereupon these items can be displayed on the screen. These items of repair information for the market phase are stored in the market information DB 16 in a form of the sort shown in FIG. 21.

Quality information is collected in this manner for each product and in each process 30 to 70, namely in the processes of parts incoming, production, repair, outgoing inspection and market. The quality information for each process is stored in the parts incoming DB 3, the inspection DB 9, the repair DB 12, the outgoing inspection DB 14 and the market information DB 16.

It should be noted that although in the foregoing description of each process, a one-dimensional bar code was employed as the information recording medium for performing individual management of parts and products, it is also possible to employ a two-dimensional bar code, an IC card or RFID, etc.

Figure 22:
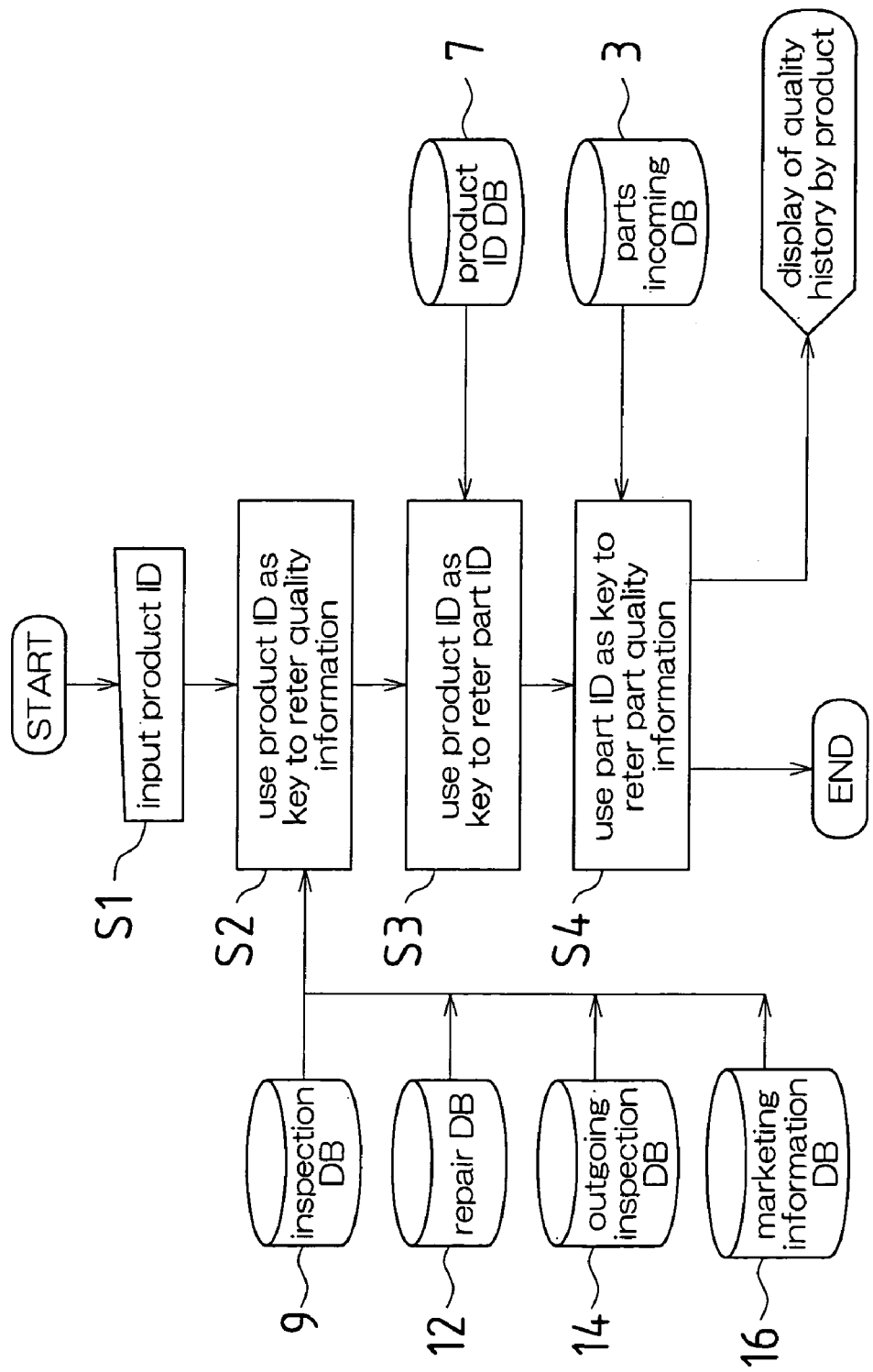
FIG. 22 is a flowchart showing the procedure for processing the quality history of products.

Next, a method of processing the quality history of each product on the basis of the above-described quality information collected in processes 30 to 70 will be described with reference to the flowchart given in FIG. 22.

In step S1, a product ID is input from a PC. Alternatively, a product ID may be obtained by using a BCR or an HT to read the bar code of the product bar code label 82 affixed to the product in question.

In step S2, quality information is refered from the inspection DB 9, the repair DB 12, the outgoing inspection DB 14 and the market information DB 16, using the product ID that has been input in step S1 as a key.

In step S3, a part ID is refered from the product ID DB 7, using the product ID that was input in step S1 as a key.

In step S4, quality information pertaining to the part reception is refered from the part reception DB 3 using the part ID refered in step S3 as a key.

When the reference results obtained in steps S3 and S4 are displayed in process order, results of the sort shown in FIG. 23 are obtained. These results shown in FIG. 23 indicate immediately when and what sort of inspection was performed on each product (i.e., for each product ID), and, if a defect has occurred, what sort of analysis and countermeasure were carried out.

Each item of data in the product ID DB 7, the inspection DB 9, the repair DB 12, the outgoing inspection DB 14 and the market information DB 16 has a product ID. Moreover, as shown in FIG. 7, the product ID includes the model name. Hence quality information for all processes from parts incoming through production and outgoing inspection to market can be gathered together and displayed by model, by extracting the model name from the product ID DB 7, the inspection DB 9, the repair database 12, the outgoing inspection DB 14 and the market information DB 16, and performing tabulation.

Figure 24:
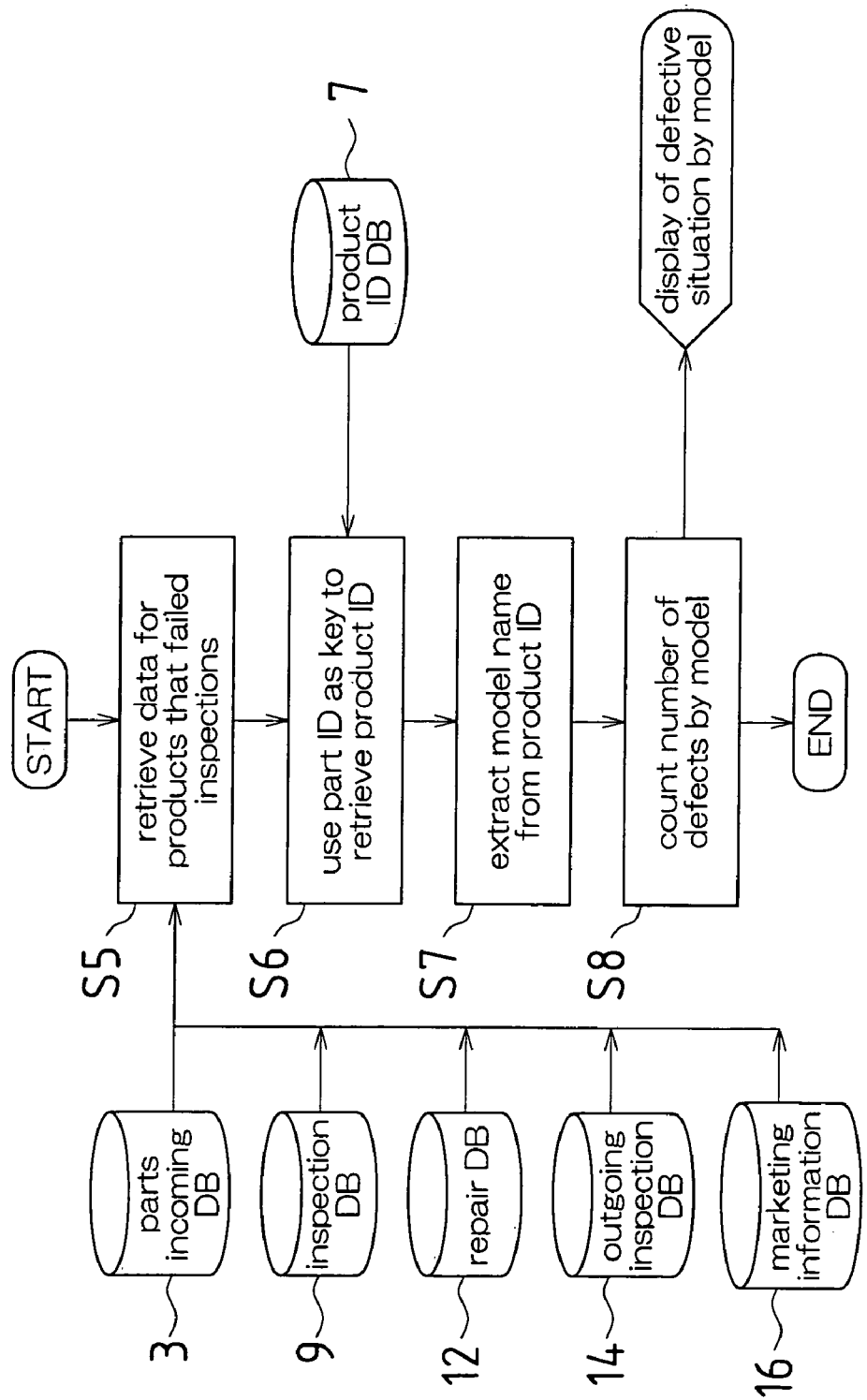
FIG. 24 is a flowchart showing the procedure for processing the quality history of models.

Next, a processing method for tabulating the quality information by model will be described with reference to the flowchart given in FIG. 24.

In step S5, only information relating to inspections for which the result is a fail is refered, by product ID or part ID, from the parts incoming DB 3, the inspection DB 9, the outgoing inspection DB 14 and the market information DB 16.

In step S6, the product ID is refered from the product ID DB 7 using the part ID from step S5 as a key.

In step S7, the model name is extracted from the product ID that was refered in step S5 and step S6.

In step S8, the number of defects is counted by using the model name obtained in step S7 and the defective code obtained in step S5 as the tabulation keys. The result of this is shown in FIG. 25, which indicates, by model, the status of defect occurrences in each process.

The quality control system described above is implemented by means of a program which performs the tabulation processing of the quality control.

The present invention encompasses both this program itself and a computer-readable recording medium in which this program is stored.

In the present invention, this recording medium may be the memory necessary for the processing to be carried out by a microcomputer (a PC). For example, something such as a ROM itself may be the program medium. Alternatively, a program reading device may be provided in the form of an external storage device (not illustrated in the drawings), in which case the program medium can be read by inserting a recording medium in this external storage device. In either of these cases, the stored program may be accessed by the microcomputer and run. Alternatively, in either of these cases the program may be read, the read program loaded into a program storage area (not illustrated) of the microcomputer, and the program run. It is assumed that a program for this loading has been stored in advance in the main system.

In the present embodiment, the above-described program medium is a recording medium constituted so as to be separable from the main system, and may be a tape such as a magnetic tape or a cassette tape; a magnetic disc such as a FD (flexible disk) or a HD (hard disk); an optical disk such as a CD-ROM, MO, MD or DVD; or a card such as an IC card (encompassing a memory card) or an optical card. Alternatively, the above-described program medium may be a medium which supports the program statically, encompassing a semiconductor memory such as mask ROM, EPROM, EEPROM or flash ROM.

Moreover, if the present invention is configured so as to be connectable to a communications network, encompassing the Internet, the program medium may be a medium which supports the program dynamically so as to download the program from the communications network. It should be noted that if the program is downloaded from a communications network in this manner, a program for this downloading may be stored in advance in the main system, or alternatively may be installed from a separate recording medium. It should also be noted that the content stored in the recording medium is not restricted to a program and may also be data.

Furthermore, in the present invention, the program as such may be the actual processing itself that is executed by the PC, or it may be a program that is or has been imported by accessing the communications network, encompassing the Internet. Alternatively, it may be a program that is sent from there. It may also be the result of processing in the above-described quality control system on the basis of the imported program. In other words, it may be a generated program. Alternatively, it may be the result of processing in the above-described quality control system when the program is sent from the communications network. In other words, it may be a generated program. It should also be noted that these variations are not restricted to the program but may also apply to data.

The present invention can be embodied in various other forms without deviating from the spirit or the main features of the invention. Hence the above-described embodiment is in all points merely an exemplification and must not be interpreted restrictively. The scope of the present invention is shown by the claims and is in no way limited by the detailed description given in the specification. Moreover, variations or modifications that fall within a scope equivalent to the claims are all deemed to lie within the scope of the present invention.

It should further be noted that the present application is based on Japanese Patent Application No. 2002-034055 filed in Japan, the contents of which are incorporated by reference in the present application. Furthermore, all the documents cited in the present specification are specifically incorporated by reference.

INDUSTRIAL APPLICABILITY

The quality control system and the quality control method of the present invention achieve terminology standardization and systematization, and are therefore capable of integrated management and multidimensional analysis of quality data. In addition, quality information can be tabulated and analyzed for each product and each model, and quality history can be tracked throughout the processes of parts incoming, production, outgoing and market, and hence the true cause of a defect can be ascertained and rapid countermeasures taken. Moreover, when a quality problem has occurred on the market, it is possible to trace the problem back to the production steps or to the component parts, and to identify and confirm the origin of the problem.

The invention claimed is:

1. A quality control system which, throughout a life cycle of a product as it passes through processes of parts incoming, production, outgoing and market, carries out an inspection at each process, and collects and manages quality information, using an information recording medium, the quality control system comprising:

a first recording means for recording the product ID unique to a given product in an information recording medium; and a first affixing means for affixing to the product, in an initial step of production, the information recording medium in which the product ID has been recorded;

a second recording means for recording a part ID unique to a given part in an information recording medium; and a second affixing means for affixing to the part, when shipping the part, the information recording medium in which the part ID has been recorded;

a first storage means for correlatively storing a product ID unique to a given product, this product ID being recorded in the information recording medium affixed to each product, and a part ID unique to a given part, this part ID being recorded in the information recording medium affixed to each part composing the product;

a master code registering means in which are registered in advance, as systematized master codes, inspection items of inspection steps performed in the processes, and quality defect information items generated in connection with at least these inspections;

a reading means for reading, during an inspection step in the processes, the product ID from the information recording medium affixed to a product being inspected;

an input means for inputting quality information including inspection results and quality defect information, this quality information being input correlatively with the product II) that has been read by the reading means;

a second storage means for storing the product ID and the quality information input from the input means; and wherein a quality history is managed for each product on the basis of the quality information stored in the second storage means.

2. The quality control system according to claim 1, wherein the product ID includes at least a model name, a date of entry to production, or a serial number for each individual product.

3. The quality control system according to claim 1, wherein the quality defect information includes, classified by process and product, at least the product ID, a cause, a responsible factor, a responsible step, a part information and a countermeasure.

4. The quality control system according to claim 1, wherein the part ID includes at least a part code, a part production date, and a serial number of the individual product for which the part in question is used.

5. A quality control method which throughout a life cycle of a product as it passes through processes of parts incoming, production, outgoing and market, carries out an inspection at each process, and collects and manages quality information, using a first information recording medium and a second information recording medium, the quality control method comprising:

a step of correlatively recording, in the first information recording medium, a product ID unique to a given product and in the second information recording medium a part ID unique to each part composing that product;

a step of affixing the second information recording medium to each part and the first information recording medium to each product;

a step of correlatively storing The product ID recorded in the information recording medium affixed to each product in a first storage means, and storing in a second storage means the part ID recorded in the second information recording medium affixed to each part composing this product;

a step of registering in advance, as systematized master codes, inspection items of inspection steps performed in the processes, and quality defect information items generated in connection with at least these inspections;

a step of reading, during an inspection step in each process, the product ID from the first information recording medium affixed to a product being inspected;

a step of inputting quality Information including inspection results and quality defect information, this quality Information being input correlatively with the product ID that has been read; and a step of storing the input product ID and quality information.

6. A computer-readable quality control program recorded on a computer-readable medium having instructions for executing, throughout a life cycle of a product as it passes through processes of parts incoming, production, outgoing and market, processing for carrying out an inspection at each process, and collecting and managing quality information by causing performance of:

a step of respectively recording, in a first information recording medium, a product ID unique to a given product, and in a second information recording medium, a part ID unique to each part composing that product, by correlatively inputting that product ID and part ID;

a step of correlatively storing, in a first storage means, the product ID recorded in the first information recording medium affixed to each product and the part ID recorded in the second Information recording medium affixed to each part composing that product;

a step of reading, during an inspection step in each process, the product ID from the first information recording medium affixed to the product being inspected, this product ID being read by a reading means; and a step of using systematized master codes for inspection items of inspection steps performed in various processes and for quality defect information items generated in connection with these inspections, to input inspection results and quality defect information from an input means, thereby storing in a second storage means, correlatively with the read product ID, quality information including the input inspection results and quality defect information.

7. A computer-readable recording medium in which a quality control program has been recorded having instructions for executing, throughout a life cycle of a product as it passes through Processes of pads incoming, production, outgoing and market, processing for carrying out an inspection at each process, and collecting and managing Quality information by causing performance of:

a step of respectively recording, in a first information recording medium, a product ID unique to a given product and in a second information recording medium, a Dart ID unique to each Dart composing that product by correlatively inputting that product ID and part ID;

a step of correlatively storing, in a first storage means, the product ID recorded in the first information recording medium affixed to each product and the part ID recorded in the second information recording medium affixed to each part composing that product;

a step of reading, during an inspection step in each process, the product ID from the first information recording medium affixed to the product being inspected, this product ID being read by a reading means; and a step of using systematized master codes for inspection items of inspection steps performed in the various Processes and for quality defect information items generated in connection with these inspections, to input inspection results and quality defect information from an input means, thereby storing in a second storage means, correlatively with the read product ID, quality information including the input inspection results and quality defect information.

* * * * *

UNITED STATES PATENT AND TRADEMARK OFFICE
CERTIFICATE OF CORRECTION

| | | |
|---|---|---|
| PATENT NO. | : 7,099,728 B2 | Page 1 of 1 |
| APPLICATION NO. | : 10/495375 | |
| DATED | : August 29, 2006 | |
| INVENTOR(S) | : Urabe | |

It is certified that error appears in the above-identified patent and that said Letters Patent is hereby corrected as shown below:

\*\*On the Cover page, the Foreign Application Priority Data is missing. It should read:

Item "(30)\*\*Foreign Application Priority Data

February 12, 2002    (JP) ................................2002-034055"

Signed and Sealed this

Fifth Day of January, 2010

David J. Kappos
*Director of the United States Patent and Trademark Office*